United States Patent [19]

Stutz

[11] 4,104,112

[45] Aug. 1, 1978

[54] METHOD AND APPARATUS FOR CONCENTRATING AQUEOUS SOLUTIONS

[75] Inventor: Robert C. Stutz, Kenmore, N.Y.

[73] Assignee: Niagara Blower Company, Buffalo, N.Y.

[21] Appl. No.: 407,231

[22] Filed: Oct. 17, 1973

[51] Int. Cl.² .............................................. B01D 1/16
[52] U.S. Cl. .................................. 159/4 R; 159/48 L;
202/200; 202/198
[58] Field of Search .............. 159/4 A, 4 CC, 4.7 NS,
159/4.7 WL, 31, 4 K, 48 L; 55/32, 259;
261/DIG. 11; 203/49

[56] References Cited

U.S. PATENT DOCUMENTS

| | | | |
|---|---|---|---|
| 2,022,740 | 12/1935 | Rowell | 55/259 X |
| 2,221,787 | 11/1940 | Downs et al. | 159/4 K X |
| 2,222,561 | 11/1940 | Downs et al. | 159/13 C |
| 2,367,695 | 1/1945 | Spiselman | 159/13 C |
| 2,693,247 | 11/1954 | Olstad et al. | 159/4 K X |
| 2,881,853 | 4/1959 | Kelley | 55/32 X |
| 2,990,341 | 6/1961 | Graybill | 159/DIG. 15 |
| 3,261,147 | 6/1966 | Allander | 55/259 X |
| 3,395,510 | 8/1968 | Barnes | 55/259 X |
| 3,456,709 | 7/1969 | Vegeby | 159/4 A |
| 3,557,864 | 1/1971 | Berg | 159/4 A |

FOREIGN PATENT DOCUMENTS

| | | | |
|---|---|---|---|
| 894,936 | 4/1962 | United Kingdom | 159/4 K |
| 939,431 | 10/1963 | United Kingdom | 159/4 K |

Primary Examiner—Norman Yudkoff
Attorney, Agent, or Firm—E. Herbert Liss

[57] ABSTRACT

Apparatus for concentrating an aqueous solution of higher boiling point organic antifreeze medium includes a casing having a first and second upright legs connected by a third inclined leg. The first leg is open at the upper end to provide an ambient air inlet and includes a spray discharge nozzle, heating coils, an extended evaporation surface and a sump vertically disposed with respect to each other. The second leg constitutes a multistage reflex chamber having a plurality of alternately disposed reflex cooling coils and reclaiming screens of glass fiber cloth, each screen formed in a plurality of zigzag stretches. The third leg connects the first and second legs and is inclined downwardly from the second casing to the first casing to permit migration of liquid to the sump. A pump and conduits are provided to supply liquid from the sump to the discharge nozzle. A blower is provided in the second leg to draw ambient air and evaporated solution from the air inlet through the first leg, connecting leg and second leg respectively.

7 Claims, 1 Drawing Figure

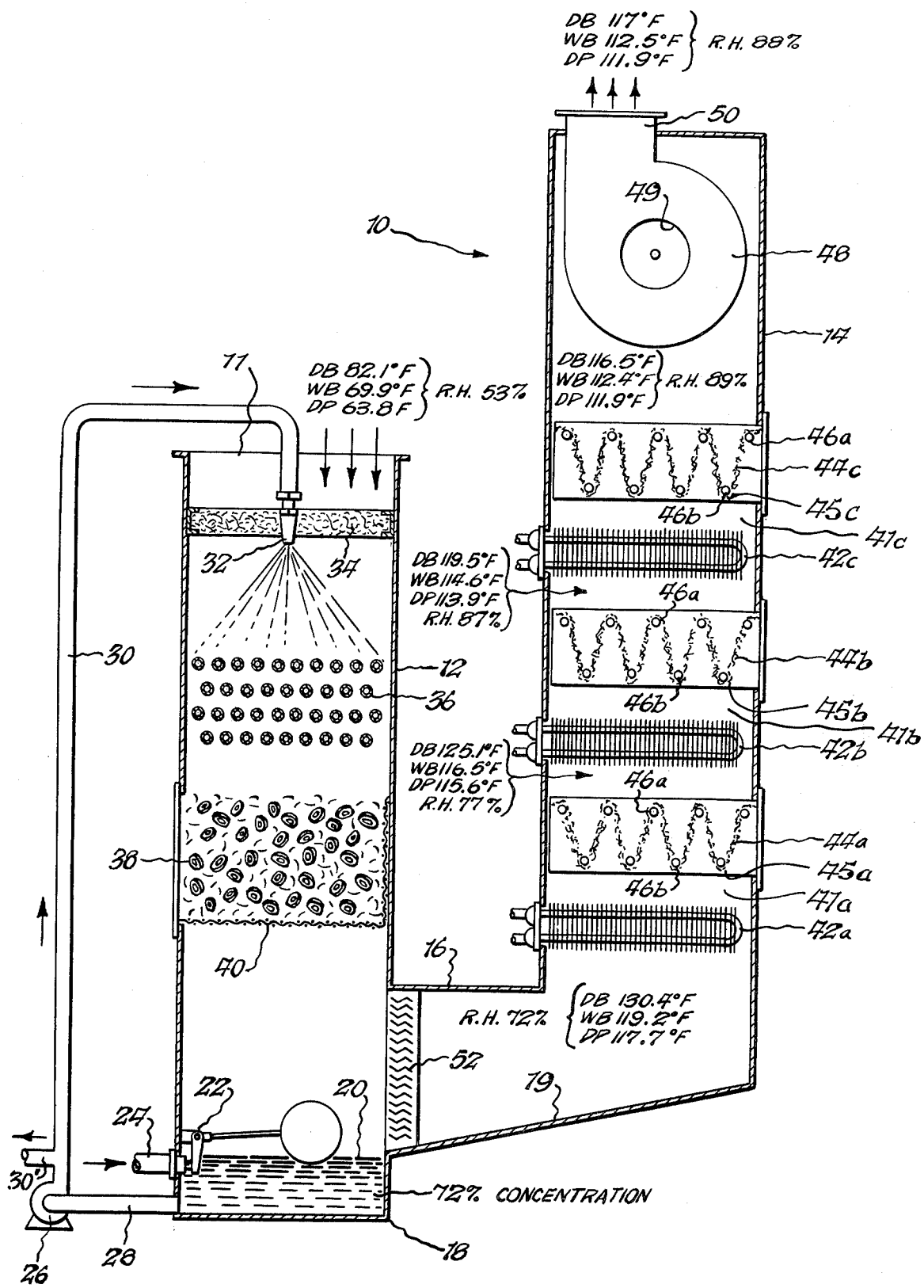

METHOD AND APPARATUS FOR CONCENTRATING AQUEOUS SOLUTIONS

This invention relates to a method and apparatus for reconcentrating an aqueous solution containing organic antifreeze medium having a boiling point higher than the normal boiling point of water.

A recirculated aqueous solution may become progressively more dilute when used as a spray solution to flood air cooling coils maintained at sub-freezing temperatures as described in my copending application Ser. No. 363,515 filed May 24, 1973 for Heat Exchange Apparatus.

In such use the flooding of the sub-freezing air cooling coils in the apparatus being served prevents icing up of the coils from moisture in the air. However, this moisture is absorbed into the spray solution as a diluent.

Furthermore the loss of antifreeze medium is an economic disadvantage. In order to maintain the effectiveness of the antifreeze medium for defrosting the air cooling coils in heat exchange apparatus it is necessary to keep the antifreeze medium within relatively high limits of concentration; it is necessary therefore to periodically or continuously remove a portion of the moisture which it has absorbed from the defrosting operation in order to maintain the antifreeze medium at the desired strength.

The present invention provides a novel multistage reflux concentrator. Each successive stage not only additively decreases losses of the organic antifreeze medium but more importantly enhances the effectiveness of the preceding stage in gathering adherent aerosols by washing the filter of the preceding stage and weakening the solution thereon by causing droplets trapped on the reclaiming screens to migrate back through the screen of the preceding stage. As the highly humid air is drawn through the apparatus the relative humidity is increased and the dew point is decreased at each successive reflux stage to further increase the effectiveness of the concentrator and to reduce the loss of antifreeze medium.

One of the principle objects of the present invention is to provide a method and apparatus for concentrating an aqueous solution of organic antifreeze medium without substantial loss of antifreeze medium.

Another object of the invention is to provide such a method and apparatus which involves a relatively simple and economical mechanism for concentrating an aqueous solution of organic antifreeze medium.

Other objects and advantages of the invention will be apparent from the following detailed description taken in connection with the accompanying drawing in which:

FIG. 1 is a sectional view of the reconcentrating apparatus which is the subject matter of the invention.

In the embodiment of the invention illustrated in the drawing a casing 10 includes an upright leg 12, an upright leg 14 and an inclined connecting leg 16 sloping downwardly toward the lower end of the leg 12. The bottom of the leg 12 forms a sump 18 for a body 20 of aqueous solution of relatively high boiling point organic antifreeze medium. The leg 12 is open at its upper end to provide an air inlet 11. Disposed at the sump 18 is a float valve 22 to control the level of the body of liquid 20 in the sump 18. An inlet pipe 24 is provided to admit the antifreeze medium to the sump 18. A pump 26 draws the solution from the sump 18. The pump has an inlet line 28 and an outlet 30 with a branch 30'. The branch 30' supplies concentrated solution to the apparatus being served; outlet line 30 extends into the open top 11 of the leg 12 of casing 10 and terminates in a downwardly directed spray nozzle 32. The leg 12 of the casing 10 has disposed adjacent the open top 11 an air inlet filter 34 of any suitable fibrous material as for example glass fiber. The spray nozzle 32 extends through the filter 34. Below the air inlet filter 34 is a bank of heating coils 36 which may be heated by any suitable medium such as steam. Underlying the heating coil bank 36 is a bed 38 of Berl Saddles which are supported on a screen 40 secured to the inside of the casing. The Berl Saddles form an extended evaporation surface.

The second upright leg 14 includes a plurality of reflux cooling coils **42*a*, 42*b* and 42*c* arranged vertically within the casing leg 14. Also vertically arranged within the casing leg alternately disposed between the reflux coils 42*a*, 42*b* and 42*c* are a plurality of filters or reclaiming screens 44*a*, 44*b* and 44*c*. The reclaiming screens or filters 44*a*, 44*b* and 44*c* may be felted cloth of glass fibers strung alternately between upper and lower supporting bars 46*a* and 46*b*. Each reclaiming screen 44 and its underlying reflux coil 42 constitutes a reflux stage. A fan or blower 48 is mounted at the upper end of the leg 14 with its outlet 50 extending outwardly of the end of the leg 14**.

The generally horizontal inclined leg 16 extends from the lower end of the leg 14 to the casing 12 in the space between the bed of Berl Saddles 38 and the sump 18. An eliminator 52 is mounted at the junction of the leg 12 and the casing 16. The eliminator comprises a stack of zigzag plates which serve to whip the air back and forth for removing any entrained liquid passing therethrough.

Operation

The apparatus as above described is used to reconcentrate a solution of water containing an organic antifreeze medium, such as one of the higher alcohols which substances have boiling points higher than the normal boiling point of water. The primary object of the invention is to effect such concentration economically without substantial loss of the organic antifreeze medium. The concentrations of the aqueous solution when used as an antifreeze medium to spray air cooling coils may range from approximately 50% to 80% or more. The recirculation of the solution through sprays directed against these air cooling coils prevent the coils from icing up. In such an application the solution absorbs moisture and is diluted. The spray solution is admitted to the apparatus of the present invention via the inlet pipe 24, under control of the float valve 22, which maintains a constant level of a body 20 of the spray solution in the sump 18 of one upright leg 12 of a casing 10 which leg is open at its top to provide an ambient air inlet 11.

The reconcentration of the spray solution is principally through evaporation of its lower boiling water content into a stream of ambient air moving downwardly through the leg 12 from its open top or air inlet 11. For this purpose, the spray solution from the body 20 is recirculated through the casing leg 12 as follows:

The pump 26 having an inlet line 28 withdraws spray solution from this body 20. The pump has an outlet line 30, one branch 30' of which can return the concentrated solution to the apparatus being served (under suitable control — not shown) and the other branch 30 of which extends into the open top or ambient air inlet 11 of the casing leg 12 and terminates in a downwardly directed spray nozzle 32.

This nozzle discharges the spray solution against the tubes of a bank of heating coils 36 which can be heated by any medium, such as steam. The heating coils 36 are flooded and the excess solution falls onto an extended wetted evaporation surface such as a bed of Berl saddles. From the Berl saddles, the excess solution falls back into the body 20 in the sump 18.

Air is moved through the apparatus as follows:

The air fan 48 is in the second upright casing leg 14, the bottom 19 of which communicates via a generally horizontal passage 16 with the sump 18 of the first casing leg 12. This bottom or floor panel 19 of the second casing leg 14 and horizontal passage 16 is inclined to drain to the body 20 of spray solution in the sump 18.

The air fan 48 has its inlet 49 in the top of the enclosed second casing leg 14 and its discharge 51 outside of the casing so that it draws ambient air in through the open top or air inlet 11 of the first casing leg 12. Preferably this ambient air first passes through the air filter 34 to remove soiling particles and then passes down the first casing leg 12, past the spray nozzle 32 and through the heating coil 36 and bed of Berl saddles 38. Heating the ambient air stream and recirculating solution promotes evaporation of the water content of the spray solution into the air stream because of its lower boiling point as compared with the antifreeze medium. This evaporation is further increased by the extended wetted area provided by the bed of Berl saddles. The reconcentrated spray solution falls from the bed of Berl saddles back into the body 20 in the sump 18.

However the highly humidified air leaving the bottom of the bed of Berl saddles still contains about 3% antifreeze medium per pound of water. Such loss cannot be tolerated. The present invention provides a multiple stage reflux cooling and recovery system to prevent such loss of the antifreeze medium.

From the bottom of the first casing leg 12 the humidified air passes through the zigzag plates of an eliminator 52 which serve to whip the air back and forth and remove any entrained liquid. The highly humid air then passes through the horizontal passages 16 into the bottom of the second casing leg 14. There it comes into contact with the first fin-surfaces reflux cooling coil 42*a*. This chills the highly humidified air to a point where the air passing up through the space or chamber 41 above the cooling coil developes a mist or fog of liquid particles or aerosols, containing principally the antifreeze medium. This mist or fog laden air then passes through the first glass fiber filter 44*a*. This filter is made of a felted cloth of glass fibers strung alternately between upper and lower supporting bars 46*a* and 46*b* to have tentlike stretches through which the mist laden air passes. These zigzag stretches of the glass fiber filter cloth 44*a* terminate in bottom edges 45*a*. It is important that the body material of the filter cloth 44*a* have an affinity and good surface tension for liquid particles. Glass fibers have such affinity. The liquid particles or aerosols deposit on the glass fibers and, through surface tension, gather into larger and larger droplets to a point where they migrate downwardly to fall from the bottom edges 45*a* of the glass fiber filter cloth 44*a* through the chamber and first cooling coil 42*a* onto the inclined bottom plate 19 of the horizontal passage 16 which leads to the body of spray liquid 20 in the sump 18.

The moist air leaving the glass fiber filter cloth 44*a*, still containing some antifreeze medium, flows upwardly through the second fin-surfaces reflux cooling coil 42*b*. This again chills the highly humidified air to a point where the air passing up through the space or chamber 41*b* above this cooling coil developes a fog or mist of liquid particles or aerosols, containing principally the antifreeze medium. This mist or fog laden air then passes through the second glass fiber filter cloth 44*b* which is identical to the first glass fiber filter 44*a*. The liquid particles or aerosols deposit on the glass fibers and, through surface tension, gather into larger and larger droplets to a point where they migrate downward and fall from the bottom edge 45*b* through the chamber 44*b* and cooling reflux coil 42*b* onto the first glass fiber filter cloth 44*a*, thereby to act as a reflux condensate, washing and keeping the solution thereon weaker.

The moist air leaving the glass fiber filter cloth 44*b*, still containing some antifreeze medium, flows upwardly through the third chamber and third fin-surfaced cooling coil 42*c*. This again chills the highly humidified air passing up through the chamber or space above the cooling coil 42*c* to a point producing a fog or mist of liquid particles or mist of aerosols containing principally the antifreeze medium. This mist or fog laden air then passes through the third glass fiber filter cloth 44*c*, which is identical with the first glass fiber filter cloth filter 44*a*. The liquid particles or aerosols deposit on the glass fibers and, through surface tension, gather into larger and larger droplets to a point where they fall from the bottom edges 45*c*, through the reflux cooling coil 42*c* onto the glass fiber filter cloth 44*b* thereby to act as a reflux condensate, washing the glass fiber filter 44 *b* and keeping the solution thereon weaker.

Because of the progressive reduction of the antifreeze content of the humid air passing through the reflux cooling coils 42*a*, 42*b* and 42*c* and their reclaiming glass fiber filters 44*a*, 44*b* and 44*c*, and because of the reflux flow of the condensate through the glass fiber filter cloths 44*c*, 44*b* and 44*a*, with attendant progressive lowering of the dewpoint temperatures in the chambers or spaces 41*a*, 41*b* and 41*c* and corresponding changes in vapor pressures in these chambers or spaces, the vapor entering the fan inlet 49 contains only 0.24% of antifreeze medium per pound of water. The use of a succession of reflux cooling coils and reclaimers, as described, results in progressively diminishing returns so that an excess of reflux stages is not economical. In many applications two stages may be sufficient. Where exceptional efficiency in reconcentration is required the third stage may be utilized and in rare cases even additional reflux stages can be employed within the broader aspects of the invention.

Specific Example

To illustrate the importance of changes in dewpoint temperatures, vapor pressures, concentrations, and reflux flow and dilution in the reflux stages, the following specific example is given, the temperatures being in Fahrenheit.

The ambient air was supplied to the air inlet 11 at 82.1° dry bulb and 69.9° wet bulb to have 63.8° dewpoint temperatures and a 53% relative humidity. Steam was supplied to the bank of heating coils 36 at 228.7° so that the air-vapor temperature above the Berl Saddles was 156.3°. On passing through the Berl Saddles and evaporating thereon, this dry bulb temperature dropped to 146.5°.

This maintained a 133.9° temperature of the spray liquid in the sump 18, this liquid being recirculated and sprayed over the heating coils 36 and Berl Saddles 38.

After passing the eliminator plates 52 to remove entrained liquid, the vapor in the chamber below the lowermost reflux cooling coil 42a had 130.4° dry bulb, 119.2° wet bulb and 117.7° dew point temperatures, with a relative humidity of 72%.

The three reflux cooling coils 42a, 42b and 42c were supplied with coolant at 81.7° and on passing through the lowermost or first reflux coil 42a, the dry bulb and dew point temperatures were lowered to 125.1° and 115.6° respectively, and the relative humidity raised to 77%. This temperature drop formed a mist or fog of droplets or aerosols which impinged on the glass fibers of the lowermost or first filter cloth 44a and adhered thereto. These aerosols, through surface tension, gathered into drops large enough to migrate by gravity downwardly along the glass fiber filter 44a from the bottom edges 45a they fall through the lowermost reflux cooling coil 42a onto the bottom inclined panel 19 to flow to the sump 18. Through vapor pressure the aerosols so collecting on the glass fiber filter cloth 44a were largely composed of the higher alcohol, due to its higher boiling point.

The vapor, largely water but still containing some higher alcohol, then passed upwardly through the second reflux cooling coil to emerge, in the chamber 41b above with still lower dry bulb and dew point temperatures of 119.5° and 113.9°, respectively and at a higher relative humidity of 87%. Again, with such cooling a fog of aerosols were formed which collected on the second glass fiber filter 44b. These again gathered into downwardly migrating drops which fell from the bottom edges 45b of the filter cloth 44b, through the second reflux cooling coil 42b onto the first filter cloth 44a. These drops were weaker in antifreeze medium than the drops falling from this first or lowermost filter cloth 44a, as previously described, and hence they serve to keep the total solution gathering on the first or lowermost filter cloth 44a weak as well as to wash this filter cloth 44a. Both of these functions increased the efficiency of the first or lowermost filter cloth 44a in gathering adherent aerosols.

To reduce the loss of the antifreeze medium to a small fraction of 1% (0.24%) by weight per pound of water evaporated, the vapor leaving the second filter cloth 44b was subjected to a third reflux treatment. For this, the air and vapor passed upwardly through the third reflux cooling coil 42c, to emerge in the chamber 41c above with still lower dry bulb and dew point temperatures of 116.5° and 112.4°, respectively, and a higher relative humidity of 89%. Again, with such cooling a mist of aerosols formed which collected on the third or last filter cloth 44c. The droplets again were principally of the higher boiling point antifreeze medium and again gathered into downwardly migrating drops which fell from the bottom edges 45c of the third or last filter cloth 44c, through the third or last reflux cooling coil 42c onto the second filter cloth 44b. These weaker drops served to keep the total solution gathering on the second filter cloth 44b weaker, as well as to wash this filter cloth 44b. Again both of these functions increased the efficiency of the second filter cloth in gathering adherent aerosols.

From the foregoing description it will be apparent that a highly efficient method and apparatus for reconcentrating aqueous solutions of organic antifreeze medium having higher boiling points than the normal boiling point of water is provided. The method and apparatus hereinabove described results in an extremely low loss of organic antifreeze medium in the reconcentration process.

Although a specific embodiment has been shown and described for the purpose of illustration it will be apparent that other embodiments and modifications are possible within the scope of the invention. For example, the extended wetted evaporation surface may employ materials other than Berl Saddles as described. The filter cloth may utilize fibers other than glass fibers which have affinity and good surface tension for liquid particles. Although three reflux stages are shown it should be understood that more than three stages may be employed and two stages may be utilized within the scope of the invention. Therefore the invention is not limited to the specific examples shown but may include all the embodiments and modifications which fall within the scope of the invention.

What is claimed is:

1. Apparatus for concentrating an aqueous solution of an organic antifreeze medium comprising a casing including a first upright leg open at its upper end to provide an air inlet, a second upright leg and a connecting leg connecting said first and second upright legs at their lower ends, said first upright leg containing means for evaporating said aqueous solution into a stream of ambient air, a sump positioned at the lower end of said casing for said aqueous solution and spray means positioned at said air inlet for discharging the aqueous solution against said evaporating means, pump means and conduit for drawing said aqueous solution from said sump and directing it to said spray means; said second leg containing a plurality of alternately-disposed cooling coils and reclaiming filters forming a multistage reflux chamber, the stages of said multistage chamber being disposed one below the other and interdependent, each stage being in direct counterflow communication with an adjacent stage with respect to condensed liquid, each reclaiming filter except the uppermost being positioned to receive gravitating droplets directly from a subsequent superjacent reclaiming filter whereby condensed droplets of said antifreeze medium gravitate from one stage to the preceding stage relative to the direction of air flow to thereby clean the reclaiming filter of said preceding stage and to dilute the solution condensed thereon and thence gravitate to the sump, and fan means for drawing the ambient air through said air inlet, said evaporating means thence through the connecting leg and multistage reflux chamber.

2. Apparatus according to claim 1 wherein said filters in said second leg comprise zigzag stretches of glass fiber filter cloth.

3. Apparatus according to claim 2 wherein said evaporating means comprise heating coils and an extended evaporation surface disposed therebelow.

4. Apparatus according to claim 3 wherein said extended evaporation surface comprises solid bodies providing an extended wetted evaporation surface.

5. Apparatus according to claim 1 wherein an eliminator is disposed between said first leg and said connecting leg for removing entrained liquid.

6. Apparatus according to claim 1 wherein said connecting leg is inclined downwardly from said second leg to said first leg to permit migration of liquid from said second leg to said sump.

7. The method of concentrating an aqueous solution of a high boiling point organic antifreeze medium, which comprises producing a stream of such aqueous medium, producing a stream of ambient air, applying heat to at least one of said streams, exposing an extensive area of said stream of such aqueous medium to said stream of ambient air to evaporate water from said aqueous medium into said air and produce a highly humid air vapor stream and also a body of a liquid concentrated in said antifreeze medium, cooling said highly humid air and vapor stream to condense a first mist of droplets largely of said antifreeze medium, passing said first mist through a first screen to trap the droplets therein and raise the relative humidity of the highly humid air and vapor stream leaving said first screen, cooling said highly humid air and vapor stream leaving said first screen to condense a second mist of droplets largely of said antifreeze medium, passing said second mist through a second screen to trap the droplets therein and raise the relative humidity of the highly humid air and vapor stream leaving said second screen, transferring the trapped droplets from said second screen to said first screen to wash said first screen and lower the concentration in the organic antifreeze medium collecting thereon, and transferring said trapped droplets from said first screen to said body of liquid concentrated in said antifreeze medium.

* * * * *